United States Patent
Chen et al.

(10) Patent No.: US 6,606,498 B2
(45) Date of Patent: Aug. 12, 2003

(54) STATE MODEL FOR A WIRELESS DEVICE

(75) Inventors: Hsi-Kun Chen, Tai-Chung (TW); Yu-Jen Hsueh, Tao-Yuan (TW)

(73) Assignee: Syncomm Technology Corp., Chung Li (TW)

( * ) Notice: Subject to any disclaimer, the term of this patent is extended or adjusted under 35 U.S.C. 154(b) by 37 days.

(21) Appl. No.: 09/683,470

(22) Filed: Jan. 3, 2002

(65) Prior Publication Data

US 2003/0125009 A1 Jul. 3, 2003

(51) Int. Cl.⁷ .................................................. H04Q 7/20
(52) U.S. Cl. ........................................ 455/450; 455/509
(58) Field of Search ................................. 455/404, 435, 455/450, 452, 453, 509, 434; 370/337, 468

(56) References Cited

U.S. PATENT DOCUMENTS 5,475,735 A * 12/1995 Williams et al. ............ 455/403
5,790,676 A * 8/1998 Ganesan et al. ............ 380/247
5,812,951 A * 9/1998 Ganesan et al. ............ 455/445
6,009,326 A * 12/1999 Roder et al. ................ 455/436
6,192,244 B1 * 2/2001 Abbadessa .................. 455/436

* cited by examiner

Primary Examiner—William Trost
Assistant Examiner—James D Ewart
(74) Attorney, Agent, or Firm—Winston Hsu (57) ABSTRACT

A Personal Access Communications System (PACS) subscriber unit (SU) layer 3 interface is designed as a finite state machine that includes a unique slot seizing state. All transitions from a null state that require traffic channel seizing first transition to the slot seizing state before transitioning to another associated handling state. While in the slot seizing state, the SU layer 3 interface state machine awaits confirmation of traffic channel establishment.

7 Claims, 10 Drawing Sheets

STATE MODEL FOR A WIRELESS DEVICE

BACKGROUND OF INVENTION

1. Field of the Invention

The present invention relates to a state machine. More specifically, the present invention discloses a state machine with a unique slot seizing state that is compatible with Personal Access Communications System (PACS) protocol enabled devices.

2. Description of the Prior Art

Figure 1:
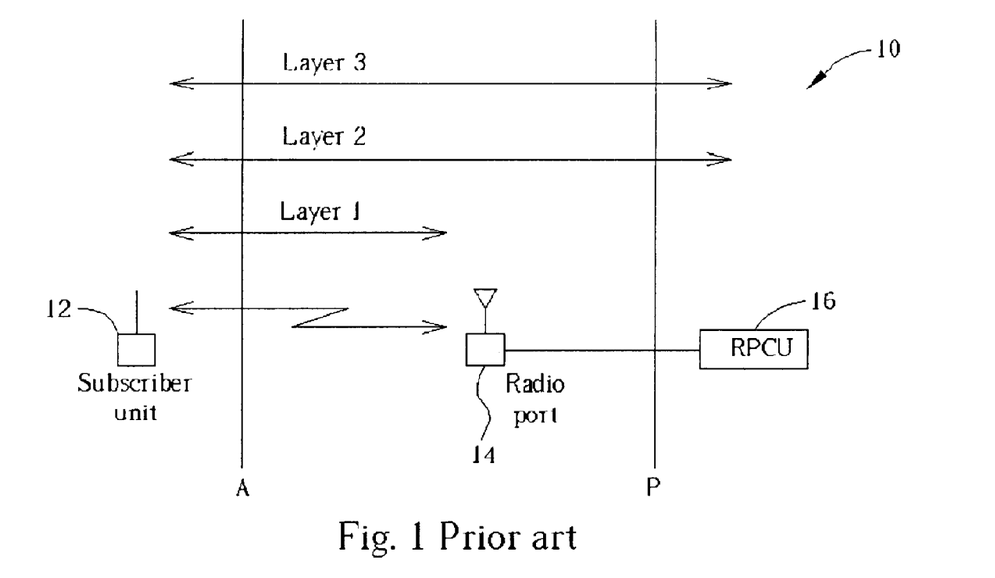
FIG. 1 is a partial functional diagram of Personal Access Communications System (PACS) architecture and signaling layers.

Please refer to FIG. 1. FIG. 1 is a partial functional diagram of Personal Access Communications System (PACS) architecture and signaling layers, which is fully described in the PACS Air Interface Rev. A manual, and which is incorporated herein by reference. A typical PACS wireless environment 10 includes one or more subscriber units (SUs) 12 in wireless communications with one or more radio ports (RPs) 14. The RPs 14, in turn, are in communications with a radio port controller unit (RPCU) 16, which controls the RPs 14, receiving signals from, and sending signals to, the RPs 14. The RPCU 16 is used to connect to a broader access network (not shown) such as a telephone network or the like. Interface A is an air interface, which is bridged by wireless signals between the SU 12 and the RP 14. Most modern communications protocols are arranged as a three-tiered structure, with the lowest layer, layer 1, being the physical layer that connects two devices. The layer 1 interface thus bridges interface A, extending only so far as the RP 14. Interface P provides connectivity between the RPCU 16 and the RPs 14, the exact nature of which may vary from implementation to implementation. There is a corresponding state machine on both the SU 14 and RPCU 16 sides for layer 2 communications, and the situation is similar for layer 3. Instead of layers 2 and 3, RP 14 plays the layer 1 role of bridging interfaces A and P.

Figure 2:
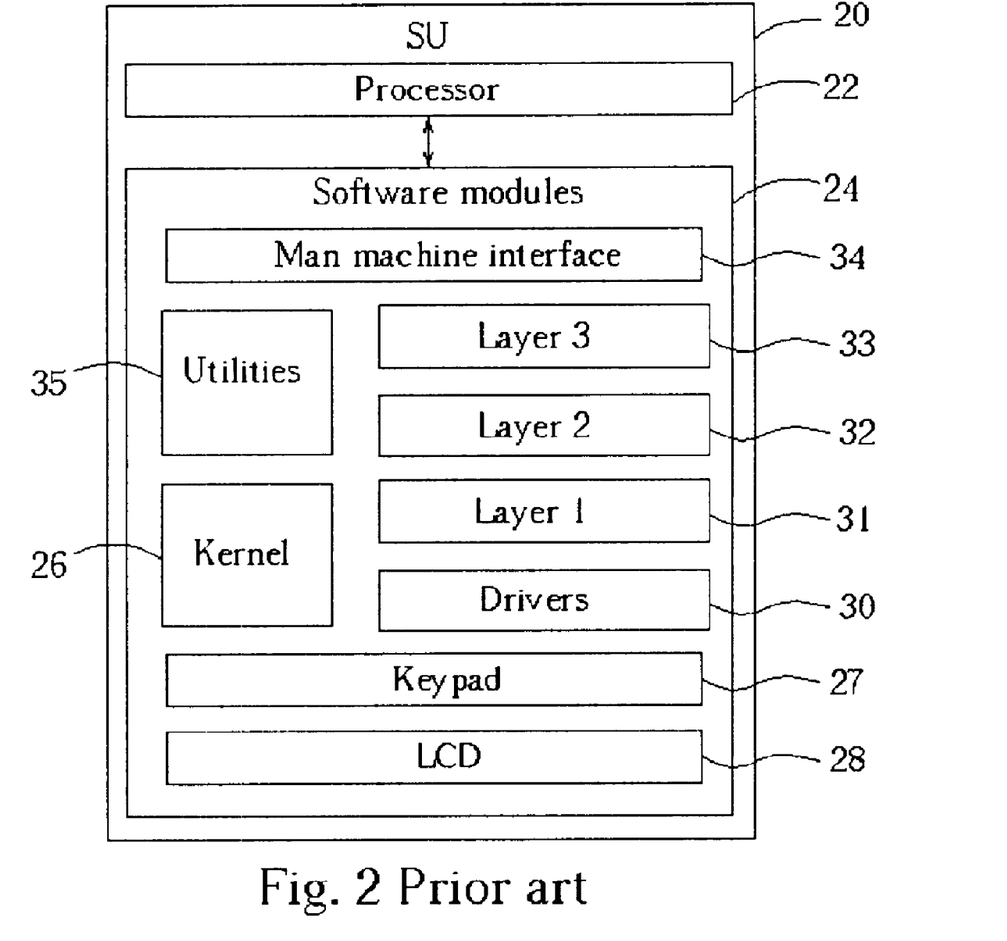
FIG. 2 is a simplified block diagram of a PACS subscriber unit (SU).

Please refer to FIG. 2. FIG. 2 is a simplified block diagram of a PACS SU 20. The SU 20 includes a processor 22 that executes SU software modules 24. The software modules 24 include kernel code 26 that is implementation-specific, depending upon the hardware used within the SU 20; drivers 30 for providing a general interface with the kernel 26; a layer 1 interface 31; a layer 2 interface 32; a layer 3 interface 33; a man machine interface (MMI) 34 and utilities 35. The utilities 35 provide such functionality as timers and timer management, memory management, and the like. The MMI 34 is in charge of controlling an LCD 28, and handling input signals from a keypad 27, to provide a user interface for the SU 20. The PACS layer 3 interface 33 supports the MMI 34, and provides authentication, privacy (encryption/decryption), emergency calls and supplemental services. The PACS layer 2 interface 32 supports the layer 3 interface 33, and provides for alerting services, channel access, synchronization, multiplexing/demultiplexing, segmentation and assembly and the like. The PACS layer 1 interface 31 supports the layer 2 interface 32 and provides the physical link required to communicate with an RP 14, and hence the RPCU 16.

Figure 3:
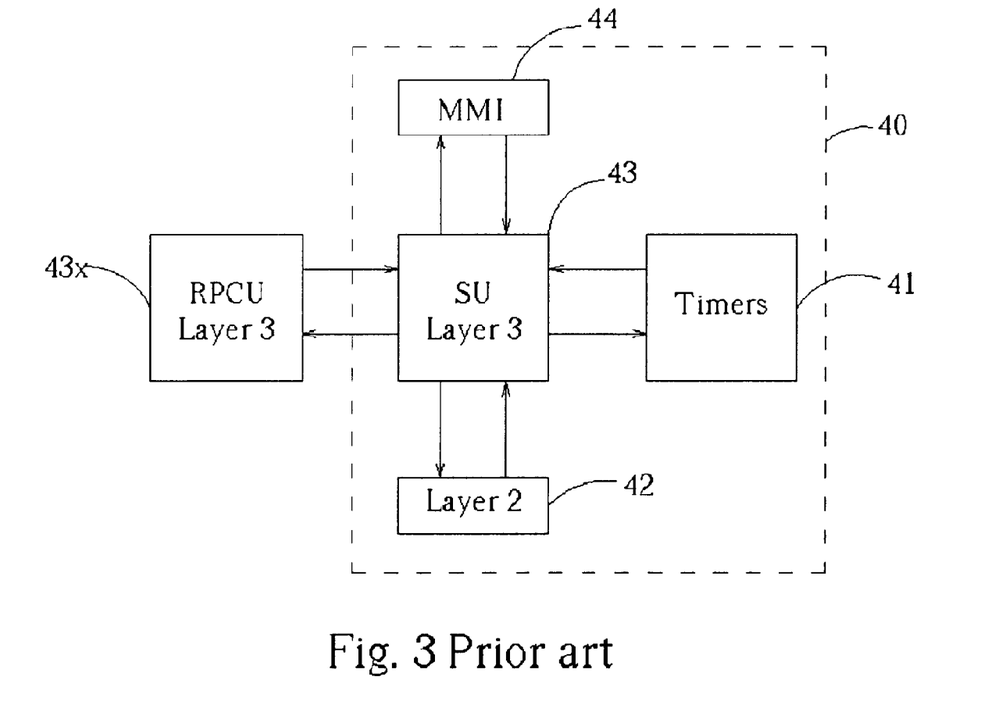
FIG. 3 is a block diagram for communications in a PACS system from a SU layer 3 perspective.

Please refer to FIG. 3. FIG. 3 is a block diagram for communications in a PACS system from a SU layer 3 perspective. Within a SU 40, a PACS layer 3 interface 43 is in communications with an MMI 44 for the SU 40, a PACS layer 2 interface 42, timers 41, and a PACS RPCU layer 3 interface 43x. Communications with the RPCU layer 3 interface 43x is wireless in nature, through the layer 2 interface 42, and a supporting layer 1 interface (not shown). However, from the standpoint of the SU layer 3 interface 43, such complications are not apparent, and the SU layer 3 interface 43 appears to communicate directly with the RPCU layer 3 interface 43x, both passing messages to, and receiving messages from, the RPCU layer 3 interface 43x. Similarly, the SU layer 3 interface 43 exchanges messages with the MMI 44 and the lower layer 2 interface 42. The layer 3 interface 43 is able to set a plurality of timers 41, and receive notification when any of the timers 41 expires.

Figure 4:
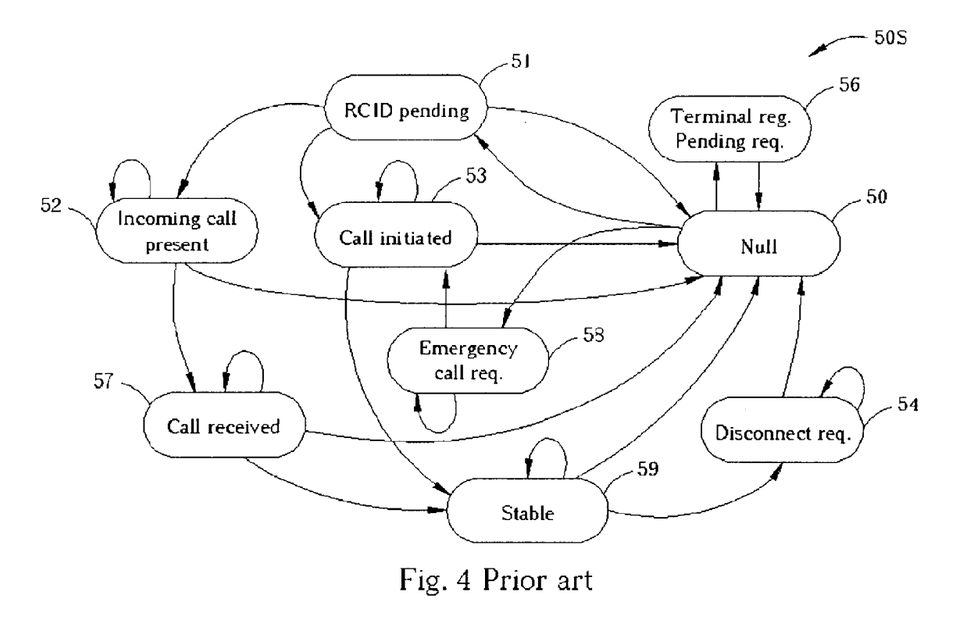
FIG. 4 is a finite state model for a PACS layer 3 interface.

Please refer to FIG. 4. FIG. 4 is a finite state model for a PACS layer 3 interface. For stable and predictable operations, a PACS layer 3 interface runs as a finite state machine 50S, transitioning from one state to another on an event, and performing some action just prior to the state transition. A key state is a null state 50 in which the layer 3 state machine 50S has no traffic channel established with an RPCU 16 and is awaiting anything "interesting" to happen. Any "interesting" event will cause the state machine 50S to transition out of the null state 50 and into another state designed to handle that particular "interesting" event. For example, one such event is a layer 2 42 notification that the SU 40 must register with the RPCU 16. On such an event, the state machine 50S transitions to a terminal registration pending state 56 to await confirmation of registration with the RPCU 16. Two other types of events are incoming call detection and non-emergency call origination events. In the first, another user is attempting to call the SU 40. In the later, the MMI 44 indicates that the user is attempting to make a call. In either event, the state machine 50S first transitions to a radio call identifier pending state 51 to await reception from the RPCU layer 3 interface 43x of an identifier for the particular call. After receiving the radio call identifier from the RPCU layer 3 interface 43x, the state machine 50S transitions to either an incoming call present state 52, or a call initiated state 53 depending on whether or not the SU 40 is the originator of the call. In the incoming call present state 52, the state machine 50S waits for the user to answer the call, and alerts the user of an incoming call (i.e., by ringing the telephone). When the user answers the phone, the state machine 50S transitions into a call received state 57. In the call received state 57, the SU 40 informs the RPCU layer 3 interface 43x that the user has answered the phone, and awaits acknowledgement from the RPCU layer 3 interface 43x. Once the RPCU layer 3 interface 43x acknowledges the SU 40, the state machine 50S transitions into a stable state 59. Similarly, in the call initiated state 53, the state machine 50S awaits for connection confirmation from the RPCU layer 3 interface 43x that the call has been placed. Once such confirmation is received, the state machine 50S transitions into the stable state 59. It is in the stable state 59 that the exchange of user information (voice or data) occurs. Hanging up the phone, as indicated from the MMI 44, causes the state machine 50S to transition into a disconnect request state 54 in which the SU 40 inform the RPCU layer 3 interface 43x that the call is terminated and awaits acknowledgment of such from the RPCU layer 3 interface 43x. On such acknowledgment, the state machine 50S transitions back into the null state 50. Due to their nature, emergency calls are handled separately from normal, non-emergency calls. On detection of origination of an emergency call, the state machine 50S transitions from the null state 50 into an emergency call request state 58. While in the emergency call request state 58, the SU 40 awaits registration of the call with the RPCU layer 3 interface 43x, confirmation of which causes the state machine 50S to then transition into the call initiated state 53.

Every transition from the null state 50 requires that the SU 40 establish a traffic channel with the RPCU layer 3 interface 43x. This is termed slot seizing, and is required for any type of originating call, incoming calls, and terminal registration of the SU 40. However, the prior art does not distinctly provide for slot seizing. Slot seizing should not properly be performed in the null state 50 as the null state is specifically a state in which no traffic channel is established with the RPCU layer 3 interface 43x. Slot seizing must then be performed separately in each of the other states, such as in the terminal registration pending state 56, the radio call identifier pending state 51, and the emergency call request state 58. This makes these states unnecessarily complex, and further blurs the exact roles of these states. Software failure of the finite state machine 50S is made more probable, and determination of the exact cause of such a failure is made more complex.

SUMMARY OF INVENTION

It is therefore a primary objective of this invention to provide a slot seizing state for a PACS layer 3 finite state machine to provide a state machine with more distinctly defined states.

Briefly summarized, the preferred embodiment of the present invention discloses a finite state machine for a wireless device. The wireless device has a processor for executing program code to implement a plurality of states and to effect transitions between the states. The states include a null state for acting upon registration, call origination, and incoming call detection events; a slot seizing state for acting upon establishment of a traffic channel; a radio call identifier pending state for awaiting upon a radio call identifier; a terminal registration pending state for awaiting registration of the wireless device, and an emergency call request state for requesting emergency call services. The finite state machine transitions from the null state to the slot seizing state on any one of the registration, call origination, or incoming call detection events to effect establishment of the traffic channel, transitions from the slot seizing state to the radio call identifier pending state upon establishment of the traffic channel and any one of a non-emergency call origination event or the incoming call detection event, transitions from the slot seizing state to the terminal registration pending state upon establishment of the traffic channel and the registration event, and transitions from the slot seizing state to the emergency call request state upon establishment of the traffic channel and an emergency call origination event. When in the slot seizing state and upon expiration of a first timer, the finite state machine starts a second timer and then transitions to the null state, and when in the null state and upon expiration of the second timer, the finite state machine continues attempting registration until successful.

It is an advantage of the present invention that by providing the slot seizing state, the functionality of the finite state machine is more clearly defined. Ambiguities relating when and how slot seizing should be performed are removed. Programming implementation issues are thus made easier, enabling for more stable code.

These and other objectives of the present invention will no doubt become obvious to those of ordinary skill in the art after reading the following detailed description of the preferred embodiment, which is illustrated in the various figures and drawings.

DETAILED DESCRIPTION

Figure 5:
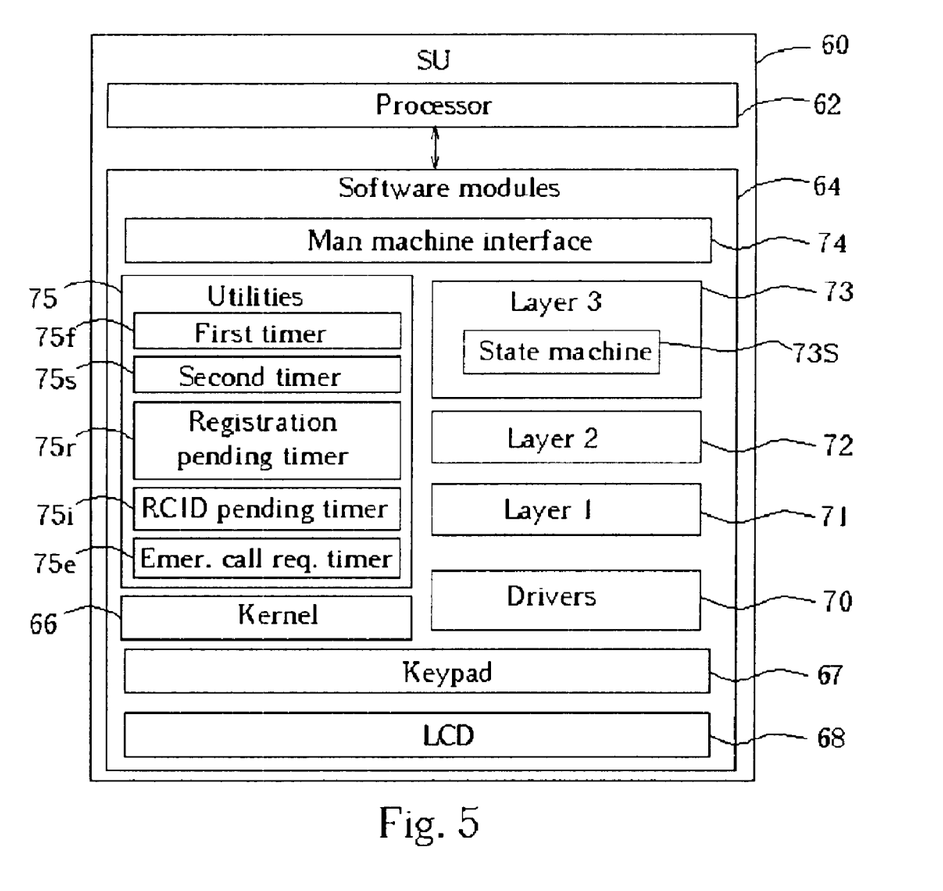
FIG. 5 is a block diagram of subscriber unit (SU) according to the present invention.

Please refer to FIG. 5. FIG. 5 is a block diagram of subscriber unit (SU) 60 according to the present invention. The SU 60 is a Personal Access Communications System (PACS) enabled device, and comprises a processor 62 that executes software modules 64 to provide for the functionality of the SU 60. The SU 60 further uses a keypad 67 as a user input device, and an LCD display 68 as an output device, both of which are utilized and controlled by the software modules 64. Although not indicated in the block diagram of FIG. 5, it should be understood that all of the discrete components of the SU 60, such as the processor 62, software modules 64 and I/O devices 67 and 68, are appropriately disposed within a housing, such as a cellular telephone housing. The software modules 64 include kernel code 66 that is implementation-specific, depending upon the hardware used within the SU 20; drivers 70 for providing a general interface with the kernel 66; a layer 1 interface 71; a layer 2 interface 72; a layer 3 interface 73; a man machine interface (MMI) 74 and utilities 75. The utilities 75 provide such functionality as timers and timer management, memory management, and the like. The MMI 74 is in charge of controlling the LCD 68, and handling input signals from the keypad 67, to provide a user interface for the SU 60. The PACS layer 3 interface 73 supports the MMI 74, and provides authentication, privacy (encryption/decryption), emergency calls and supplemental services. The PACS layer 2 interface 72 supports the layer 3 interface 73, and provides for alerting services, traffic channel access, synchronization, multiplexing/demultiplexing, segmentation and assembly and the like. The PACS layer 1 interface 71 supports the layer 2 interface 72 and provides the physical link required to communicate with a radio port control unit (RPCU, not shown).

Figure 6:
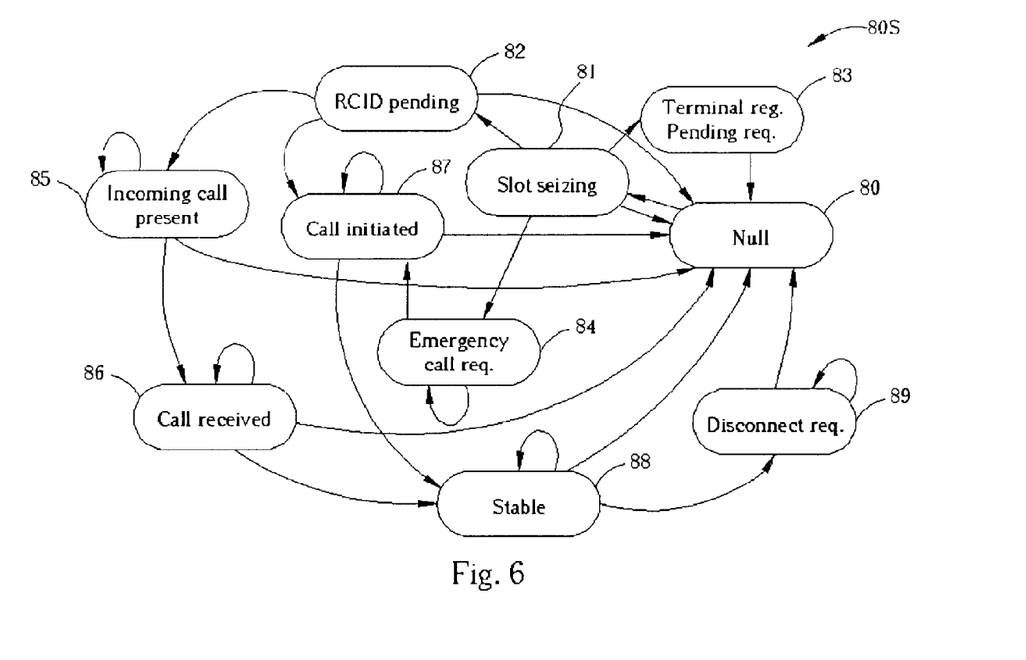
FIG. 6 is a finite state model for a PACS layer 3 interface according to the present invention.

Most of the hardware and software within the SU 60 are as given in the prior art. A key exception to this, however, is the layer 3 interface 73. Please refer to FIG .6 with reference to FIG. 5. FIG. 6 is a finite state model 80S for the layer 3 interface 73 of the SU 60 according to the present invention. The layer 3 interface 73 is implemented by a finite state machine 73S having the state model 80S. At any given time, the state machine 73S is in one of a plurality of well-defined states as given by the state model 80S. In particular, the state model 80S includes a null state 80 and a slot seizing state 81. Every transition by the state machine 73S out of the null state 80 first requires a transition into the slot seizing state 81. While in the null state 80, the layer 3 interface 73 of the SU 60 has no traffic channel established with a corresponding layer 3 interface on a RPCU, and is awaiting for either registration, call origination, or incoming call detection events to transition into the slot seizing state 81. While in the slot seizing state 81, the layer 3 interface 73 waits for establishment of a traffic channel with the RPCU layer 3 interface, and then transitions into another state depending upon the original event that lead to the transitioning into the slot seizing state 81. From the slot seizing state 82, the state machine 73S may transition into a radio call identifier (RCID) pending state 82, a terminal registration pending state 83 or an emergency call request state 84. From these three states 82, 83 and 84, the state machine 73S can reach the other states of the state model 80S. The RCID pending state 82, the terminal registration pending state 83, the emergency call request state 84, and the other states reached by these three states 82, 83 and 84, are all identical in nature to the prior art. Briefly, however, while in the RCID pending state 82, the state machine 73S waits upon a radio call identifier from the RPCU layer 3 interface. The radio call identifier is an information element used to uniquely identify a radio call for the logical association of the call through the radio equipment to network access. The state machine 73S transitions into the RCID pending state 82 from the slot seizing state 81 due to either non-emergency call origination or incoming call present events. The state machine 73S transitions into the terminal registration pending state 83 from the slot seizing state 81 on a registration event received from the layer 2 interface 72. While in the terminal registration pending state 83, the state machine 73S awaits registration of the SU 60 with the RPCU. The finite state machine 73S transitions from the slot seizing state 81 to the emergency call request state 84 on an emergency call origination event.

With regard to the other states of the state model 80S, while in the RCID pending state 82, and after receiving the radio call identifier from the RPCU layer 3 interface, the state machine 73S transitions to either an incoming call present state 85, or a call initiated state 87, depending on whether or not the SU 60 is the originator of the call. In the incoming call present state 85, the state machine 73S waits for the user to answer the call, and alerts the user of the incoming call. When the user answers the phone, the state machine 73S transitions into a call received state 86. In the call received state 86, the SU 60 informs the RPCU layer 3 interface that the user has answered the phone, and awaits acknowledgement from the RPCU layer 3 interface. Once the RPCU layer 3 interface acknowledges the SU 60, the state machine 73S transitions into a stable state 88. Similarly, in the call initiated state 87, the state machine 73S awaits for connection confirmation from the RPCU layer 3 interface that the call has been placed. Once such confirmation is received, the state machine 73S transitions into the stable state 88. It is in the stable state 88 that the exchange of user information, be it voice or data, occurs. Hanging up the phone, as indicated from the MMI 74, causes the state machine 73S to transition into a disconnect request state 89 in which the SU 60 informs the RPCU layer 3 interface that the call is terminated and awaits acknowledgment of such from the RPCU layer 3 interface. On such acknowledgment, the state machine 73S transitions back into the null state 80. On detection of the origination of an emergency call from the SU 60, the state machine 73S transitions from the null state 80 into an emergency call request state 84. While in the emergency call request state 84, the SU 60 awaits for the RPCU to respond with an RCID number that identifies this particular call, confirmation of which causes the state machine 73S to then transition into the call initiated state 87.

Figure 7:
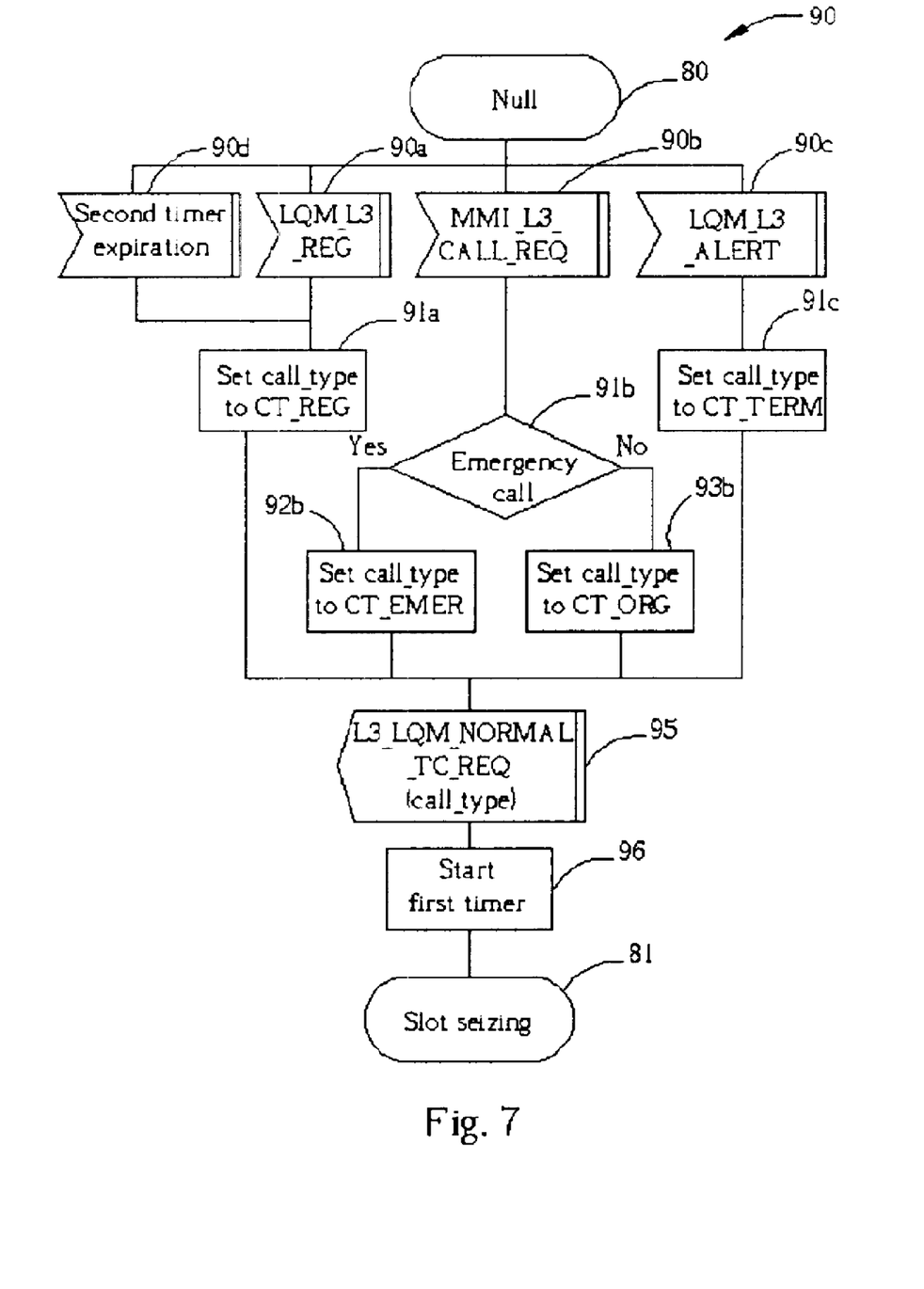
FIG. 7 is a program flow chart for a null state according to the present invention.

The slot seizing state 81 is unique to the present invention state model 80, and the null state 80 must be appropriately modified to support the slot seizing state 81. Please refer to FIG. 7 with reference to FIGS. 5 and 6. FIG. 7 is a program flow chart 90 for the null state 80. While in the null state 80, the state machine 73S waits for either a LQM_L3_REG event 90a, an MMI_L3_CALL_REQ event 90b, a LQM_L3_ALERT event 90c or a second timer expiration event 90d. The LQM_L3_REG event 90a is a signal from the layer 2 interface 72 indicating that the SU 60 must register with a RPCU, i.e., a registration event. The second timer expiration event 90d indicates that a second timer 75s has expired, and is also treated as a registration event. The MMI_L3_CALL_REQ event 90b is a signal from the MMI 74 indicating that the user is attempting to make a call, i.e., a call origination event. This may be either a non-emergency or an emergency call origination event. The LQM_L3_ALERT event 90c is a signal from the layer 2 interface 72 indicating that an incoming call is present, i.e., an incoming call detection event.

Any of the four above events 90a, 90b, 90c and 90d requires the establishment of a traffic channel. The type of traffic channel so established will depend upon the type of event being handled, and may be termed the call type of the traffic channel. At step 91a, the state machine 73S sets the call type to CT_REG, indicating that registration is to be performed, as appropriate due to the registration event at 90a or 90d. At 91b, the state machine 73S determines if the call origination event at 90b is an emergency or a non-emergency call. If the originating call is an emergency call, then, at step 92b, the call type is set to CT_EMER. Otherwise, at step 93b, the user is attempting to make a non-emergency call, and the call type is set to CT_ORG. At step 91c, the call type is set to CT_TERM, indicating that the SU 60 is acting as a terminal device, a receiver for an incoming call, in response to the incoming call detection event at step 90c. After setting the call type, which provides the layer 2 interface 72 the information needed to establish an appropriate traffic channel with the RPCU, at step 95 the state machine 73S sends an instruction to the layer 2 interface 72 to establish a traffic channel, a so-called L3_LQM_NORMAL_TC_REQ command primitive, which passes a call type parameter indicating the type of traffic channel that is to be established. The state machine 73S then starts a first timer 75f at step 96, and subsequently transitions into the slot seizing state 81

Figure 8A:
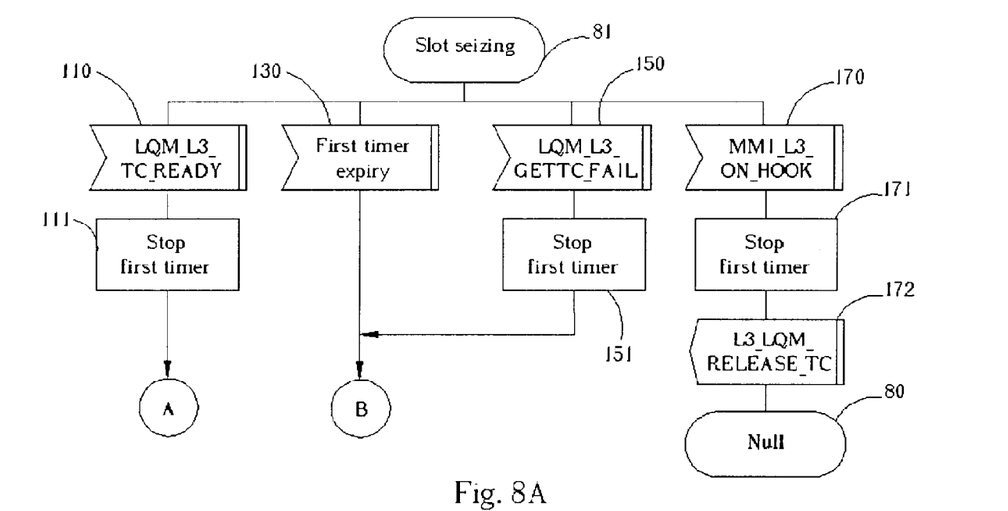
FIGS. 8A to 8C are program flow charts for a slot seizing state according to the present invention.
Figure 8B:
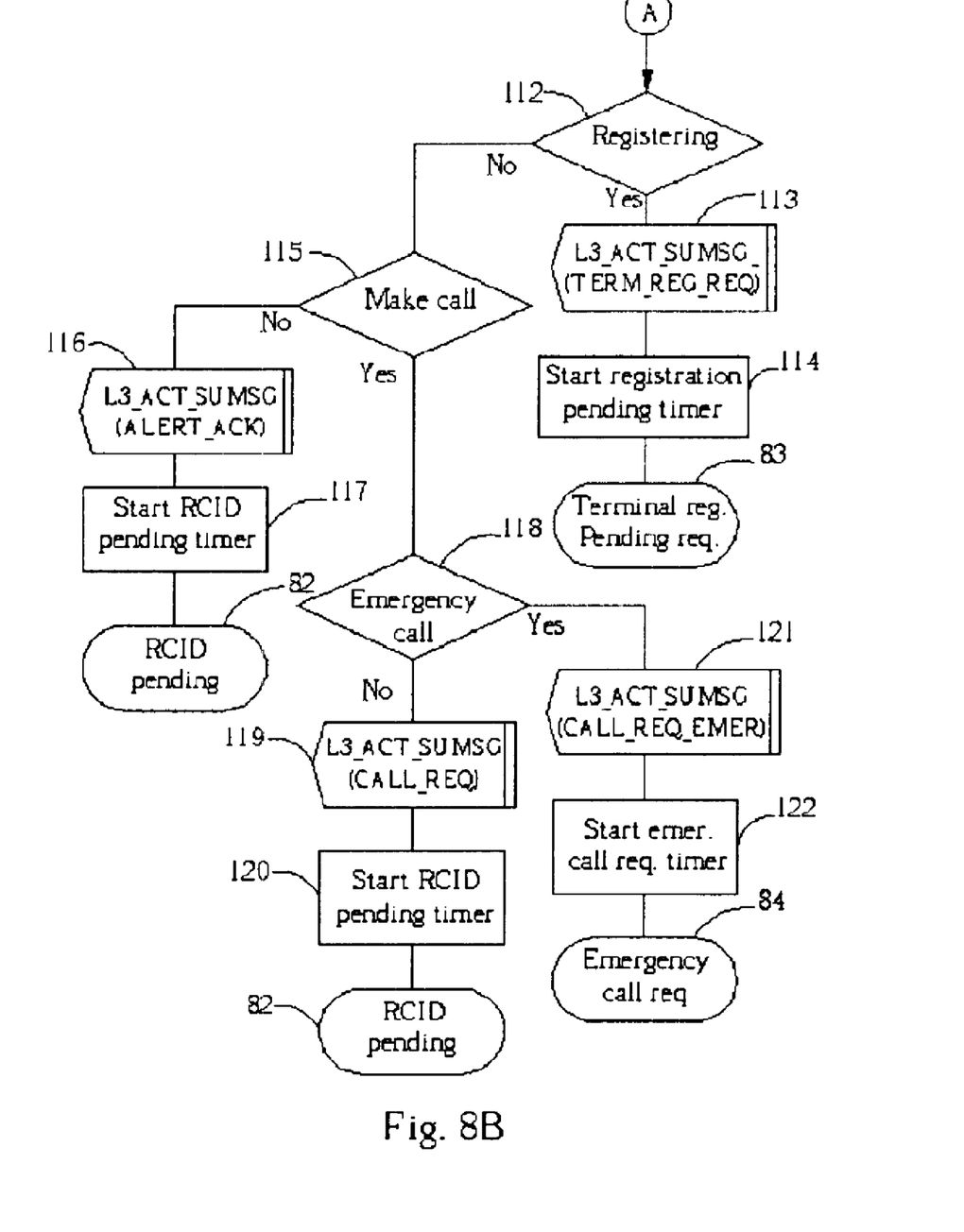
Figure 8C:
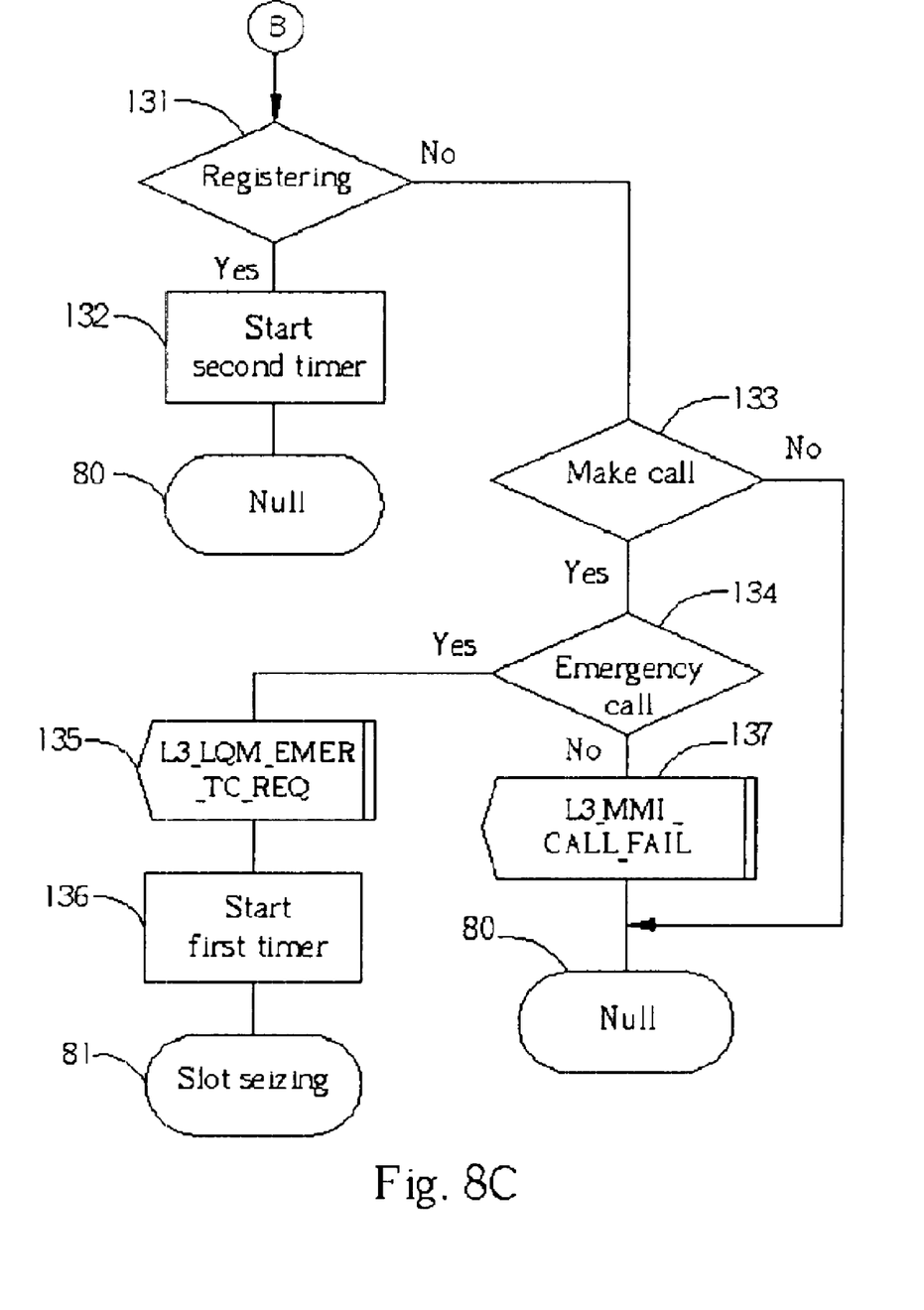

Please refer to FIGS. 8A, 8B and 8C with reference to FIGS. 5 and 6. FIGS. 8A, 8B and 8C are program flow charts for the slot seizing state 81. While in the slot seizing state 81, the state machine 73S waits for an event at step 110, 130, 150 or 170 to act upon, performs appropriate actions based upon the event, and then transitions into another state, or back into the slot seizing state 81. The events, and steps taken thereon, are enumerated below.

110:An LQM_L3_TC_READY event occurs. This is a signal from the layer 2 interface 72 telling the layer 3 interface 73 that a traffic channel has been successfully established. Proceed to step 111.

111:Stop the first timer 75f. The first timer 75f is used for timeout purposes for situations in which the layer 2 interface 72 does not respond in time to the traffic channel establishment primitive executed in the null state 80, i.e., the L3_LQM_NORMAL_TC_REQ command primitive of step 95 (in FIG. 7). As a response has been received from the layer 2 interface 72, the first timer 75f is no longer needed. Proceed to step 12 (FIG. 8B).

112:Was the traffic channel established for registering the SU 60? That is, was the call type set to CT_REG in the null state 80? If so, proceed to step 113. Otherwise, proceed to step 115.

113:The SU 60 is registering with the RPCU. Send a registration request message to the RPCU layer 3 interface and proceed to step 114.

114:Start a registration pending timer 75r. The registration pending timer 75r will timeout if the registration request at step 114 goes unacknowledged for too long. Transition into the terminal registration pending state 83.

115:Is the SU 60 the originator of the call? That is, is the call type set in the null state 80 either CT_EMER or CT_ORG? If so, proceed to step 118. Otherwise, proceed to step 116.

116:The SU 60 is receiving a call. Send a message to the RPCU layer 3 interface that acknowledges the incoming call detection alert. Proceed to step 117.

117:Start a RCID pending timer 75i, which will time out if the RPCU layer 3 interface takes too long to respond to the acknowledgement in step 116 with a radio call identification code. Transition into the RCID pending state 82.

118:The SU 60 is the originator of the call. Is the call an emergency call? That is, is the call type set in the null state 80 CT_EMER? If so, proceed to step 121. Otherwise, proceed to step 119.

119:Inform the RPCU layer 3 interface that the SU 60 desires to make a call. Proceed to step 120.

120:Start the RCID pending timer 75i and transition into the RCID pending state 82.

121:Inform the RPCU layer 3 interface that the SU 60 is attempting to make an emergency call. Proceed to step 122.

122:Start an emergency call request timer 75e that will timeout if the RPCU layer 3 interface takes too much time in responding to the emergency call request in step 121. Transition to the emergency call request state 84.

130:The first timer has expired. This means the RPCU has taken too long to respond to the traffic channel establishment request that was performed in the null state 80. Traffic channel establishment is therefore assumed to have failed. Proceed to step 131 (FIG. 8C).

131:Was the attempted traffic channel establishment for registration purposes of the SU 60? That is, was the call type set to CT_REG in the null state 80? If so, proceed to step 132. Otherwise, proceed to step 133.

132:Registration was trying to be performed. Start the second timer 75s that will trigger a second timer expiration event (event 90d in FIG. 7) to cause a registration process at a later time to retry terminal registration of the SU 60. Transition into the null state 80. Note, then, that once the second timer 75s expires, and the state machine 73S is in the null state 80, a second timer expiration event 90d will occur to cause the state machine 73S to transition back into the slot seizing state 81 after starting the first timer 75f. In this manner, the state machine 73S can continuously and repetitively cycle between the null state 80 and the slot seizing state 81 until the SU 60 successfully establishes a traffic channel for terminal registration purposes.

133:Registration was not being performed. Was the SU 60 attempting to make a call? That is, is the call type set in the null state 80 either CT_EMER or CT_ORG? If so, proceed to step 134. Otherwise, transition into the null state 80.

134:The SU 60 was attempting to make a call. Is the call an emergency call? That is, is the call type set in the null state 80 CT_EMER? If so, proceed to step 135. Otherwise, proceed to step 137.

135:Send a command primitive to the layer 2 interface 72 requesting the establishment of a traffic channel to handle the emergency call. Proceed to step 136.

136:Start the first timer 75f that will timeout if the emergency traffic channel establishment request of step 135 goes unacknowledged for too long. Return back to the slot seizing state 81. In this manner, the state machine 73S will repetitively attempt to establish an emergency traffic channel to handle the emergency call, continuously retrying until successful.

137:The call was not an emergency call. In this case, simply inform the MMI 74 that the call was unable to be completed, and transition into the null state 80.

150:The layer 2 interface 72 informs the layer 3 interface 73 that the layer 2 interface 72 was unable to establish the requested traffic channel with the RPCU. Proceed to step 151.

151:Stop the first timer 75f, in as much as the purpose of the first timer 75f is to deal with those situations in which a response from the layer 2 interface 72 has been too long in the coming.

170:The MMI interface 74 has informed the layer 3 interface 73 that the user has canceled the call. Proceed to step 171.

171:Stop the first timer 75f. Whether or not the traffic channel is established is no longer of any importance, and no further response is required of the layer 2 interface 72. Proceed to step 172.

172:Send a command to the layer 2 interface 72 instructing the layer 2 interface to release the traffic channel. This is necessary to insure that the state machine of the RPCU layer 3 interface remains synchronized with the state machine 73S. Proceed to the null state 80.

In contrast to the prior art, the present invention provides for a unique slot seizing state that is explicitly designed to handle traffic channel establishment procedures. A standard null state is modified to handle the slot seizing state, and exclusively transitions to the slot seizing state on any event that requires traffic channel creation. This provides for a state machine with more clearly defined states, and neatly partitions distinct tasks into appropriate states. Debugging is consequently made easier, while simultaneously providing for a more stable software design.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless device comprising a processor and program code to implement a finite state machine with a plurality of states and to effect transitions between the states, the finite state machine comprising:

a null state for acting upon registration, call origination, and incoming call detection events;

a slot seizing state for acting upon establishment of a traffic channel, the finite state machine transitioning from the null state to the slot seizing state on any one of the registration, call origination, or incoming call detection events to effect establishment of the traffic channel;

a radio call identifier pending state for awaiting upon a radio call identifier, the finite state machine transitioning from the slot seizing state to the radio call identifier pending state upon establishment of the traffic channel and any one of a non-emergency call origination event or the incoming call detection event;

a terminal registration pending state for awaiting registration of the wireless device, the finite state machine transitioning from the slot seizing state to the terminal registration pending state upon establishment of the traffic channel and the registration event; and an emergency call request state for requesting emergency call services, the finite state machine transitioning from the slot seizing state to the emergency call request state upon establishment of the traffic channel and an emergency call origination event;

wherein when in the slot seizing state and upon expiration of a first timer, the finite state machine starts a second timer and then transitions to the null state, and when in the null state and upon expiration of the second timer, the finite state machine continues attempting registration until successful.

2. The wireless device of claim 1 wherein when the finite state machine is in the slot seizing state and an on-hook event occurs prior to the establishment of the traffic channel, the finite state machine transitions to the null state.

3. The wireless device of claim 2 wherein the finite state machine stops the first timer before transitioning to the null state.

4. The wireless device of claim 1 wherein the finite state machine starts the first timer prior to transitioning from the null state to the slot seizing state.

5. The wireless device of claim 1 wherein when the finite state machine is in the slot seizing state and receives a traffic channel establishment failure event after a registration event, the finite state machine starts the second timer and transitions to the null state.

6. The wireless device of claim 5 wherein the finite state machine stops the first timer prior to transitioning to the null state.

7. The wireless device of claim 1 wherein the wireless device is compliant with Personal Access Communications System (PACS) protocol procedures.

* * * * *